(12) United States Patent
Binacchi

(10) Patent No.: US 11,319,095 B2
(45) Date of Patent: May 3, 2022

(54) APPARATUS AND METHOD FOR MANUFACTURING BEVERAGE PODS

(71) Applicant: OPEM S.P.A., Parma (IT)

(72) Inventor: Fabio Binacchi, Sorbolo (IT)

(73) Assignee: OPEM S.P.A., Parma (IT)

( * ) Notice: Subject to any disclaimer, the term of this patent is extended or adjusted under 35 U.S.C. 154(b) by 279 days.

(21) Appl. No.: 16/611,289

(22) PCT Filed: May 4, 2018

(86) PCT No.: PCT/IB2018/053103
§ 371 (c)(1),
(2) Date: Nov. 6, 2019

(87) PCT Pub. No.: WO2018/207062
PCT Pub. Date: Nov. 15, 2018

(65) Prior Publication Data
US 2020/0165019 A1    May 28, 2020

(30) Foreign Application Priority Data
May 9, 2017   (IT) .................. 102017000049857

(51) Int. Cl.
*B65B 9/04*      (2006.01)
*B65B 29/02*     (2006.01)
(Continued)

(52) U.S. Cl.
CPC .............. *B65B 9/042* (2013.01); *B29C 66/71* (2013.01); *B29C 66/849* (2013.01); *B65B 1/12* (2013.01);
(Continued)

(58) Field of Classification Search
CPC ....... B65B 9/042; B65B 9/045; B65B 29/025; B65B 1/22; B65B 1/24; B65B 7/2807; B65B 61/025
See application file for complete search history.

(56) References Cited

U.S. PATENT DOCUMENTS 2,481,611 A * 9/1949 Moore ...................... B65B 1/24
                                                        53/525
4,555,894 A * 12/1985 Illy ......................... A23F 5/125
                                                        53/528

(Continued)

FOREIGN PATENT DOCUMENTS

EP        1705122 A1    9/2006
EP        2119630 A2    11/2009
(Continued)

*Primary Examiner* — Joshua G Kotis
(74) *Attorney, Agent, or Firm* — Browdy and Neimark, PLLC

(57) ABSTRACT

An apparatus (100) for manufacturing pods (M) for beverage extraction machines is described, comprising: movement means to advance a belt (110) of waterproof material in a predetermined rectilinear direction (A), a plurality of forming plates (125) arranged below the belt and provided with at least one cavity (135), movement means to advance said forming plates in a synchronized manner with the belt, and a plurality of operational devices (165, 200, 300, 400, 500) arranged in succession along the belt; wherein said operational devices comprise for example one device for pressing down a portion of the belt into the cavity of the forming plate, a device for releasing a dose of a powder substance inside a cap (C1), a device for compacting the dose, a device for applying a second cap (C2), a device for sealing the second cap to the belt.

8 Claims, 9 Drawing Sheets

(51) Int. Cl.
*B29C 65/00* (2006.01)
*B65B 1/22* (2006.01)
*B65B 1/24* (2006.01)
*B65B 7/28* (2006.01)
*B65B 61/06* (2006.01)
*B65B 1/12* (2006.01)
*B29L 31/00* (2006.01)

(52) U.S. Cl.
CPC ............ *B65B 1/22* (2013.01); *B65B 1/24* (2013.01); *B65B 7/2807* (2013.01); *B65B 29/025* (2017.08); *B65B 61/065* (2013.01); *B29C 66/54* (2013.01); *B29C 66/8167* (2013.01); *B29C 66/8322* (2013.01); *B29L 2031/7174* (2013.01)

(56) References Cited

U.S. PATENT DOCUMENTS

| | | | | |
|---|---|---|---|---|
| 4,557,377 A | * | 12/1985 | Maloney | B65B 9/023 206/219 |
| 4,747,250 A | * | 5/1988 | Rossi | B65B 9/042 53/511 |
| 5,649,412 A | * | 7/1997 | Binacchi | B65B 9/023 53/559 |
| 5,846,584 A | * | 12/1998 | Capodieci | A21C 11/00 426/238 |
| 5,871,793 A | * | 2/1999 | Capodieci | A23L 7/126 426/238 |
| 2004/0011693 A1 | * | 1/2004 | Prenger | B30B 11/027 206/531 |
| 2010/0330237 A1 | * | 12/2010 | Deering | B65B 1/22 426/124 |
| 2015/0096263 A1 | | 4/2015 | Ehrmann | |
| 2017/0341789 A1 | * | 11/2017 | Donati | A23F 3/32 |
| 2018/0208335 A1 | * | 7/2018 | Verri | B65B 1/02 |

FOREIGN PATENT DOCUMENTS

| | | |
|---|---|---|
| FR | 2675463 A1 | 10/1992 |
| GB | 553930 A | 6/1943 |
| GB | 1173764 A | 12/1969 |
| WO | 2017017515 A1 | 2/2017 |

* cited by examiner

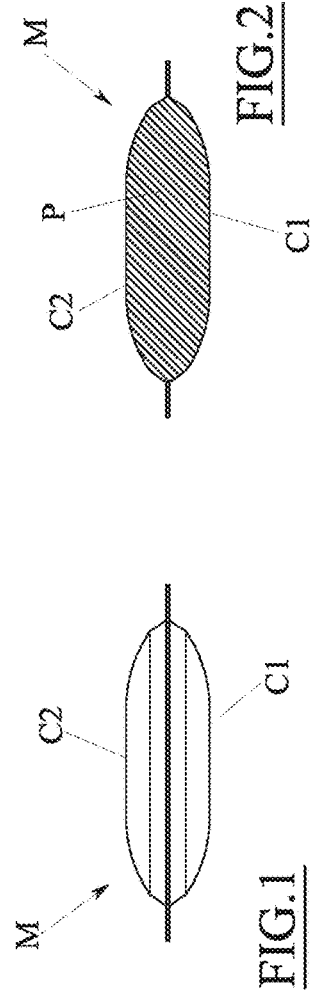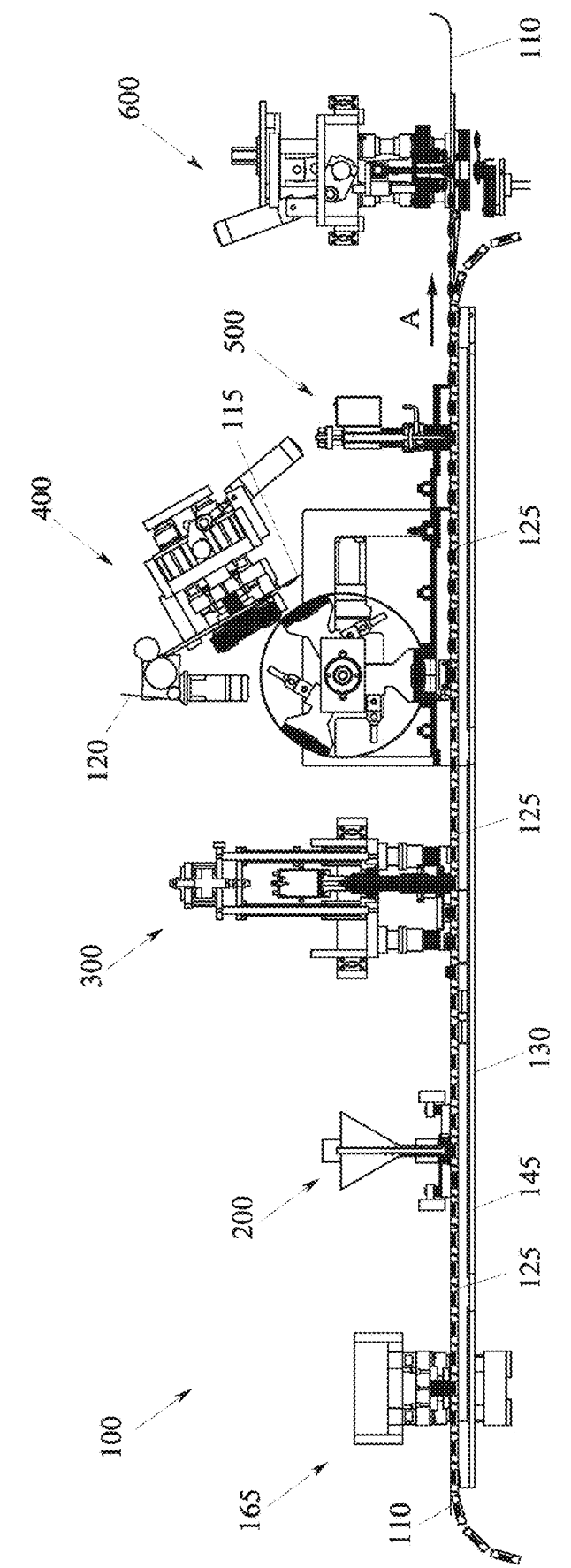

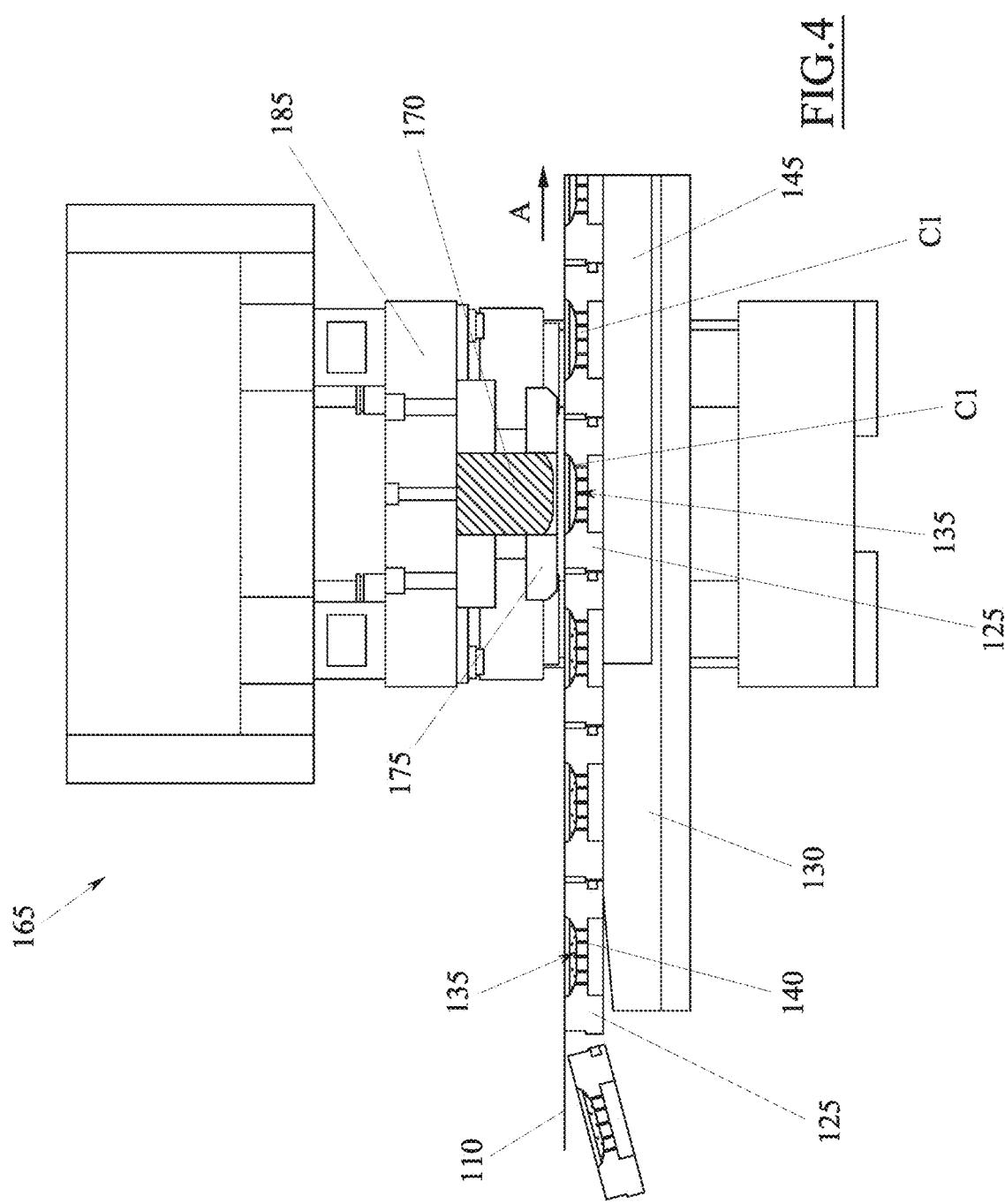

APPARATUS AND METHOD FOR MANUFACTURING BEVERAGE PODS

TECHNICAL FIELD

The present invention relates to manufacturing disposable pods—typically coffee pods—for making beverages in specific extraction machines.

In greater detail, the present invention relates to manufacturing pods consisting of a dose of coffee contained between/by two thin caps of waterproof material having for example, circular shape, that are joined to each other along a perimeter flange.

Even more specifically, the present invention relates to manufacturing coffee pods in which the coffee dose consists of a substantially solid tablet of compacted coffee powder.

Coffee pods of this type, i.e., coffee pods in which the coffee dose consists of a substantially solid tablet of compacted coffee power, are known for example, under the commercial name "Nespresso® professional".

Known Technique

A system for manufacturing coffee pods outlined above provides using specific mechanically- or hydraulically-activated presses which compact individual coffee doses with pressure sufficient to make the solid tablets.

After the compaction, the solid compacted coffee tablets are moved away from the press and transferred to an apparatus that interposes them between two belts of waterproof material, which were subjected to plastic deformation beforehand in order to make localized impressions in them adapted to define the caps.

Then the two belts of waterproof material are sealed to each other and cut so as to separate the individual pods.

A drawback of this production system however consists in the fact that the compaction operations of the coffee doses occur in a separate and independent manner with respect to the packaging of the tablets thus obtained inside the caps of waterproof material, increasing the complexity of the system and reducing the productivity thereof.

SUMMARY OF THE INVENTION

Therefore, it is an object of the present invention to provide an apparatus and a method that allow manufacturing the aforesaid coffee pods in substantially continuous and integrated manner.

It is another object of the present invention to achieve the mentioned object within the scope of a simple, rational and relatively affordable solution.

These and other objects are obtained due to the features of the invention that are indicated in the independent claims. The dependent claims outline preferred or particularly advantageous aspects of the invention.

In particular, one embodiment of the present invention makes available an apparatus for manufacturing pods for beverage extraction machines comprising:
 movement means to advance a belt of waterproof material in a predetermined rectilinear direction,
 a plurality of forming plates arranged below the belt and individually provided with at least one cavity facing the belt itself,
 movement means to advance said forming plates in the same direction as and in a synchronized manner with the belt, and
 a plurality of operational devices arranged in succession along the running direction of the belt,
 wherein said operational devices comprise at least:
  one device for pressing down a portion of the belt into the cavity of the forming plate below, impressing the shape of a cap therein,
  a device for releasing a dose of a powder substance inside the cap placed in the cavity of the forming plate,
  a device for compacting the dose inside the cap placed in the cavity of the forming plate, obtaining a compacted tablet,
  a device for applying a second cap of waterproof material on the compacted tablet inside the cap placed in the cavity of the forming plate,
  a device for sealing the second cap to the belt, obtaining a pod, and
  a device for cutting the belt, separating the pod.

Due to this solution, the compaction operation of each dose of powder substance, typically ground coffee, occurs directly inside the deformed portion of belt (cap) in which it is then packaged, obtaining a completely continuous and integrated manufacturing system.

According to one aspect of the present invention, the device for compacting the dose may comprise a vibrating group adapted to transmit a mechanical vibration to the dose.

Thereby, it is advantageously possible to obtain an increased level of compaction of the dose without using powerful presses which would be difficult to integrate in a continuous system like the one outlined.

In particular, the vibrating group may comprise:
 an ultrasonic generator adapted to generate an electric wave having a frequency in the ultrasound range,
 an electromechanical transducer adapted to transform the electric wave into a mechanical vibration, and
 a sonotrode adapted to transfer the mechanical vibration generated by the electromechanical transducer to the dose.

Due to this ultrasound compaction system, it advantageously is possible to obtain a very high level of compaction of the coffee dose with great efficiency.

According to one aspect of this system, the device for compacting the dose may also comprise a booster interposed between the electromechanical transducer and the sonotrode to amplify the mechanical vibration.

Thereby, it is effectively possible to obtain a vibration having sufficiently high amplitude without an excessive waste of energy.

Another aspect of the system provides for the device for compacting the dose to also comprise means adapted to move the sonotrode between a raised position, in which it is separated from the dose, to a lowered position, in which it presses the dose against the cap placed in the cavity of the forming plate.

Due to this solution, in addition to applying the mechanical vibration having ultrasonic frequency, the sonotrode is capable of also applying a constant pressure to the dose, which contributes to compacting the powder and giving it a suitable shape.

A further aspect of the system provides for the sonotrode to be slidably received inside a guiding jacket adapted to rest on the belt, surrounding the cap placed in the cavity of the forming plate.

This guiding frame has the function of guiding the movement of the sonotrode, laterally containing the powder substance of the dose and preforming the perimeter flange of the pod.

According to a different aspect of the invention, the device for applying the second cap of waterproof material may comprise:

movement means to advance a second belt of waterproof material in a predetermined rectilinear direction, a forming plate placed below the second belt and provided with at least one cavity facing the second belt itself, one device for pressing down a portion of the second belt into the cavity of the forming plate, impressing the shape of the second cap therein, cutting means for cutting the second belt, separating a sheet that contains the second cap, and transfer means adapted to receive said sheet and to bring it to an overlapping position with the compacted tablet.

Due to this solution, it is advantageously possible to continuously make sheets of deformable material that are provided with specific impressions (caps) adapted to receive the upper part of the tablet of compacted powder substance.

A particular aspect of the invention provides for the transfer means to comprise a rotating carousel provided with a plurality of support beams individually provided with at least one cavity and cyclically movable, due to the rotation of the carousel, from a receiving position, in which the cavity of the support beam is aligned and facing towards the second cap obtained on the sheet separated from the second belt, to a release position, in which the cavity of the support beam is facing downwards and is aligned with the compacted tablet.

Due to this solution, a quick and safe system is available for enclosing the compacted tablet between the cap impressed in the first belt of waterproof material and a second cap impressed in the sheet of waterproof material obtained from the second belt.

A further aspect of the invention provides for the transfer means to also comprise suction means to create a vacuum inside the cavity of the support beam.

Thereby, the sheets of waterproof material are firmly retained by the support beams during the rotation of the rotating carousel from the receiving position to the release position.

The present invention also makes available a method for manufacturing pods for beverage extraction machines, comprising the steps of:

advancing a belt of waterproof material in a predetermined rectilinear direction, arranging, below the belt, a plurality of forming plates individually provided with at least one cavity facing the belt itself, advancing said forming plates in the same direction as and in a synchronized manner with the belt, pressing down a portion of the belt into the cavity of the forming plate below, impressing the shape of a cap therein, releasing a dose of a powder substance inside the cap placed in the cavity of the forming plate, compacting the dose inside the cap placed in the cavity of the forming plate, obtaining a compacted tablet, applying a second cap of waterproof material on the compacted tablet inside the cap placed in the cavity of the forming plate, sealing the second cap to the belt, obtaining a pod, and cutting the belt to separate the pod.

This method substantially achieves the same advantages as the apparatus outlined above, in particular the one of performing the compaction operation of each dose directly inside the deformed portion of belt (cap) in which it is later packaged.

All the accessory aspects of the apparatus described above naturally are applicable also to the method. In particular, the compaction step may provide transmitting mechanical vibrations to the dose, preferably having a frequency in the ultrasound range, for example by means of a sonotrode. The compaction step may also provide moving the sonotrode between a raised position, in which it is separated from the dose, to a lowered position, in which it presses the dose against the cap placed in the cavity of the forming plate, possibly causing it to slide inside a guiding jacket adapted to rest on the belt surrounding said cap. On the other hand, the application of the second cap of waterproof material may comprise the steps of advancing a second belt of waterproof material in a predetermined rectilinear direction, positioning, below the second belt, a forming plate provided with at least one cavity facing the second belt itself, pressing down a portion of the second belt into the cavity of the forming plate, impressing the shape of the second cap therein, cutting the second belt, separating a sheet that contains the second cap, and transferring said sheet and bringing it in position overlapping the compacted tablet.

BRIEF DESCRIPTION OF THE DRAWINGS

Further features and advantages of the invention will be more apparent after reading the following description provided by way of a non-limiting example, with the aid of the accompanying drawings.

FIG. 1 is a side view of a pod.

FIG. 2 is a cross-section of the pod of FIG. 1.

FIG. 3 is a diagrammatic side view of a plant for obtaining the pod of FIG. 1.

FIG. 4 is an enlargement of a first pressing device of the apparatus of FIG. 3.

DETAILED DESCRIPTION

Figure 5:
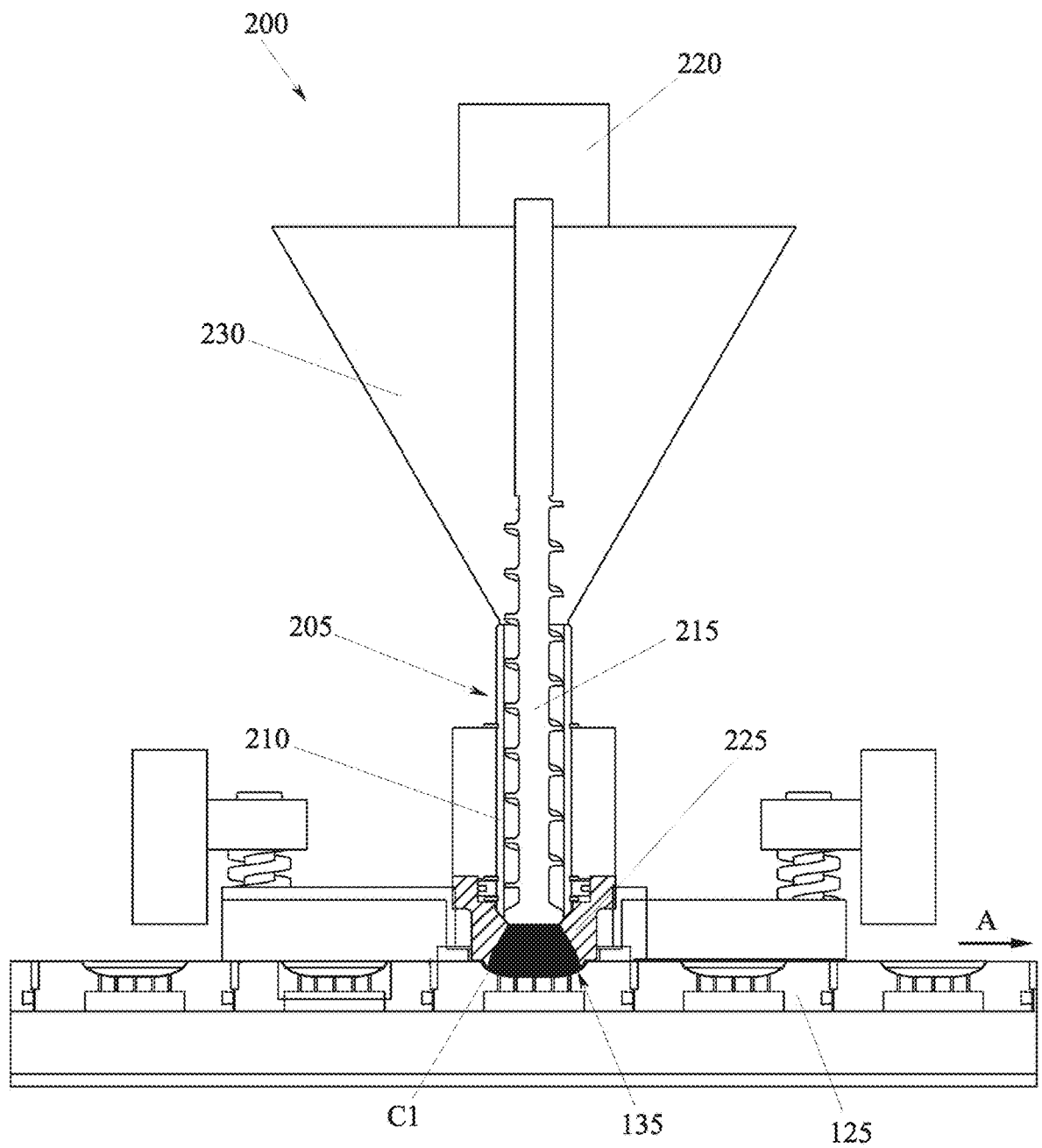
FIG. 5 is an enlargement of a dosage device of the apparatus of FIG. 3.

Reference numeral 100 globally indicates an apparatus for manufacturing disposable pods M for making beverages, for example for making coffee.

As illustrated in FIGS. 1 and 2, each pod M comprises a tablet P of a powder food substance, typically ground coffee, adapted to make the beverage desired through a percolation process. The powder substance is highly compacted, in such a manner that the tablet P substantially has a solid consistency. The tablet P is interposed and sealed between two thin caps, of which a lower cap C1 and an upper cap C2, that are mutually opposed and sealed along a perimeter flange so as to define an inner cavity that receives and completely encloses the tablet P, protecting it from the outside. The caps C1 and C2 are made with a liquid-proof, and preferably also gas-proof, material. The caps C1 and C2 may consist for example, of aluminium, plastic or of a composite material formed by various layers, among which for example a layer of aluminium, a layer of plastic and possibly a layer of paper. The plastics used for the caps C1 and C2 may be polymers such as polyethylene terephthalate (PET), polyethylene (PE), polyamide (PA), polystyrene (PS), ethylene vinyl alcohol (EVOH), polyvinylidene chloride (PVDC) and polyvinyl alcohol (PVA).

To make the pods M, the apparatus 100 comprises movement means that are adapted to advance a flexible belt 110 along a preferably horizontal predetermined rectilinear direction A. The belt 110 is made of the same material with which the lower cap C1 is made. The movement means (not illustrated because they are in themselves conventional) may comprise a first horizontal axis reel from which the belt 110 unwinds and a second horizontal axis reel onto which the belt 110 is wound after travelling an operating stretch in which is it extended and runs in the aforesaid rectilinear direction A. To allow the running of the belt 110 in the operating stretch, the first and/or the second reel may be connected to suitable motor systems that are controlled so that the advancement of the belt 110 occurs in an intermittent manner at constant steps.

The apparatus 100 comprises, below the operating stretch of the belt 110, a plurality of forming plates 125 that are arranged in a row, one after the other and coplanar, in direction parallel to the advancement direction A of the belt 110. In particular, the forming plates 125, at the operating stretch of the belt 110, may be carried resting on a rigid support surface 130 that extends parallel to the advancement direction A, while the upper surface thereof may be placed in direct contact with the lower surface of the belt 110. As better illustrated in FIG. 4, each forming plate 125 has at least one recess or cavity 135, which may substantially have the shape of a cup which concavity is facing upwards so that the mouth thereof, for example circular- or elliptical-shaped, is covered by a respective portion of the belt 110 above. Preferably, each forming plate 125 extends horizontally and transversely in direction orthogonal to the advancement direction A of the belt 110 for the whole width of the latter, and has, along the transverse extension thereof, a plurality of the aforesaid cavities 135 that are individually closed and covered by corresponding portions of the belt 110. The number of cavities 135 on each forming plate 125 naturally may vary as a function of the production needs. Each forming plate 125 may also comprise one or more through holes 140 adapted to put the respective cavity(ies) 135 into communication with a suction system adapted to create a vacuum therein. This suction system may comprise a recess 145 made in the upper surface of the support surface 130 and a vacuum pump (not illustrated) adapted to put said recess 145 in a vacuum. Thereby, the recess 145 acts as suction collector which, through the respective through holes 140, is put into direct communication with the cavity(ies) 135 of the forming plates 125 that are on the support surface 130. The apparatus 100 also comprises movement means that are adapted to advance the row of forming plates 125 in the same advancement direction A as the belt 110. In particular, these movement means are controlled in a coordinated manner with the movement means of the belt 110 in such a manner that the forming plates 125 advance at constant steps, simultaneously to the belt 110 and by the same quantity or step, so that the cavity(ies) 135 of each forming plate 125 are always covered by the same portion of belt 110 for the whole operating stretch. The movement means (not illustrated because in themselves conventional) may comprise for example, two chains wound in closed circuit about a pair of rollers having parallel and horizontal rotation axes, which engage said chains to slide in a closed path that has an upper stretch parallel to the operating stretch of the belt 110 and adjacent to the support surface 130. The forming plates 125 may be firmly fastened to the chains in such a manner that each forming plate 125 may cyclically pass in contact with the operating stretch of the belt 110.

The apparatus 100 comprises, above said operating stretch of the belt 110, a plurality of operational devices that are arranged in succession along the advancement direction A of the belt 110 so as to execute a plurality of different processing steps as the belt 110 advances in said direction.

The first operating device is a pressing device 165 adapted to deform a portion of the belt 110 by pressing it down into the cavity 135 of the forming plate 125 below, so as to make the lower cap C1 of the pod M.

As shown in FIG. 4, the pressing device 165 may comprise a punch 170, for example substantially cylindrical-shaped and having vertical axis, which is positioned above the operating stretch of the belt 110 and substantially is coaxial with the mouth of the cavity 135 of the forming plate 125. The punch 170 is associated with movement means, for example of pneumatic type (e.g. pneumatic cylinders or the like), that are adapted to move it in vertical direction between a raised position (shown in FIG. 4), in which the lower end of the punch 170 is spaced apart from the upper surface of the belt 110, to a lowered position (not shown), in which the lower end of the punch 170 is inserted inside the cavity 135 of the forming plate 125 below, so as to press down therein the portion of belt 110 interposed therebetween, deforming it and giving it the shape of the lower cap C1. To improve this deformation step, the lower end of the punch 170 may be shaped in a complementary manner to the cavity 135; moreover, the punch 170 could be heated in order to obtain a kind of thermoforming of the portion of belt 110. The pressure exerted by the punch 170 may be adjusted by adjusting the pressure in the pneumatic cylinders.

According to one aspect of the pressing device 165, such device may also comprise a locking plate 175, which has a through hole in which the punch 170 is coaxially and slidably received. The locking plate 175 is movable vertically between a raised position (shown in FIG. 4), in which it is spaced apart from the belt 110, and a lowered position (not shown), in which the locking plate 175 presses and locks the belt 110 against the upper surface of the forming plate 125 below, leaving free only the portion delimited by the through hole. Preferably, the locking plate 175 is carried in lowered position, before the punch 170 comes in contact with the belt 110.

To obtain this movement, the locking plate 175 may be associated with movement means that are independent from the ones that actuate the punch 170. More preferably however, the punch 170 and the locking plate 175 may be associated with a same vertically movable cross-beam 185, to which the punch 170 may be rigidly connected, while the locking plate 175 may be connected by means of a series of elastic spring elements (not illustrated) that normally keep it suspended at a lower height than the lower end of the punch 170.

Thereby, when the punch 170 and the locking plate 175 both are in raised position, the belt 110 and the forming plates 125 are free to slide up to bringing and stopping a forming plate 125 in the position in which the cavity 135 is aligned below the punch 170. At this point, the cross-beam 185 may be actuated to move downwards, first bringing the locking plate 175 in contact with the belt 110 and then allowing the punch 170 to be inserted into the through hole of the locking plate 175, simultaneously compressing the elastic spring elements, up to causing it to penetrate the cavity 135 of the forming plate 125. After this compression, the cross-beam 185 may be raised so as to bring the punch 170 and the locking plate 175 back into the initial position, allowing the advancement of the belt 110 and of the forming plate 125.

As shown in FIG. 4, during these steps, the forming plate 125 is always above the recess 145 of the support surface 130 so that a vacuum is created inside the cavity 135, which vacuum keeps the deformed portion of the belt 110, that is the lower cap C1 of the pod M, adhering to the bottom surface of the cavity 135 itself, also when the punch 170 is raised and when the forming plate 125 advances towards the successive operational devices.

Although reference was made in the preceding description to one punch 170 alone, it is apparent that should each forming plate 125 have a plurality of cavities 135 as explained above, the pressing device 165 could comprise a plurality of punches 170, each vertically aligned with a respective cavity 135 and slidably received inside a respective through hole of the locking plate 175.

The operational devices comprise, downstream of the pressing device 165, with respect to the advancement direction A of the belt 110, a dosage device 200 adapted to release a dose of the powder substance inside the cap C1 that is placed in the cavity 135 of the forming plate 125 below. The powder substance may be coffee, for example ground or powder coffee, with variable particle size according to needs.

As shown in FIG. 5, the dosage device 200 comprises at least one dispensing unit 205. Said dispensing unit 205 may comprise a vertical axis cylindrical body 210, which is positioned above the belt 110 substantially aligned with the cavity 135 of the forming plate 125 below. Inside this cylindrical body 210 there is axially inserted a worm screw 215, which is actuated by a suitable motor 220 by means of drive systems in themselves known. A calibrated buffer 225 may be associated at the lower end of the cylindrical body 210, which buffer has a through cavity, coaxial with the worm screw 215, to allow dispensing the powder substance downwards. Said through cavity may have a tapered lower portion with concavity facing downwards, for example substantially frustoconical-shaped, which is adapted to contain the dose of powder, giving it a predetermined shape. Preferably, the calibrated buffer 225 is connected to the cylindrical body 210 so as to rotate thereon about the common axis. The upper end of the cylindrical body 210 may be funnel-shaped and is in communication with a tank or collector 230 that receives the powder substance from a feed system of the coffee powder substance, which may comprise for example, a group of worm screws that are selectively operated based on the level of powder substance that is measured by specific sensors located in the collector 230.

The dispensing unit 205 formed by at least the cylindrical body 210, by the worm screw 215 and by the calibrated buffer 225, may be associated with specific movement means that are adapted to move it between a raised position (not shown in the drawings), in which the calibrated buffer 225 is spaced apart from the belt 110, and a lowered position (shown in FIG. 5), in which the calibrated buffer 225 presses the belt 110 against the forming plate 125 below, surrounding it and leaving accessible the cap C1 in the cavity 135. Thereby, when the dispensing unit 205 is in raised position, the belt 110 and the forming plates 125 are free to slide up to bringing and stopping a forming plate 125 in the position in which the cavity 135, with the respective cap C1 therein, is aligned below the cylindrical body 210. At this point, the dispensing unit 205 is lowered and the worm screw 215 is rotated by a predetermined quantity, so as to release the dose of powder substance directly inside the deformed portion of belt 110, that is of the aforesaid cap C1. The quantity of powder substance dispensed may be controlled by means of adjusting the rotation speed of the worm screw 215. The powder substance dispensed is latterly contained inside the lower portion of the calibrated buffer 225, allowing the dose to be given a certain pre-compression. Once dispensing is complete, specific actuation systems (not illustrated) may impart a small rotation to the calibrated buffer 225 that allows the detachment of the dose of the powder substance. Then the dispensing unit 205 may be raised, allowing the advancement of the belt 110 and of the forming plate 125, together with the dose.

Although reference was made in the preceding description to one dispensing unit 205 alone, here too should each forming plate 125 have of a plurality of cavities 135 as explained above, the dosage device 200 could comprise a plurality of dispensing units 205, each vertically aligned with a respective cavity 135, which units could be connected from the tank 230 to a single feed system of the powder substance. All the dispensing units 205 may also be mounted on sliding guides in order to be extracted from the dosage device 200 for possible maintenance and control operations.

The operational devices comprise, downstream of the dosage device 200, with respect to the advancement direction A of the belt 110, a compacting device 300 for compacting the dose of powder substance directly inside the lower cap C1 which is placed in the cavity 135 of the forming plate 125.

Figure 6:
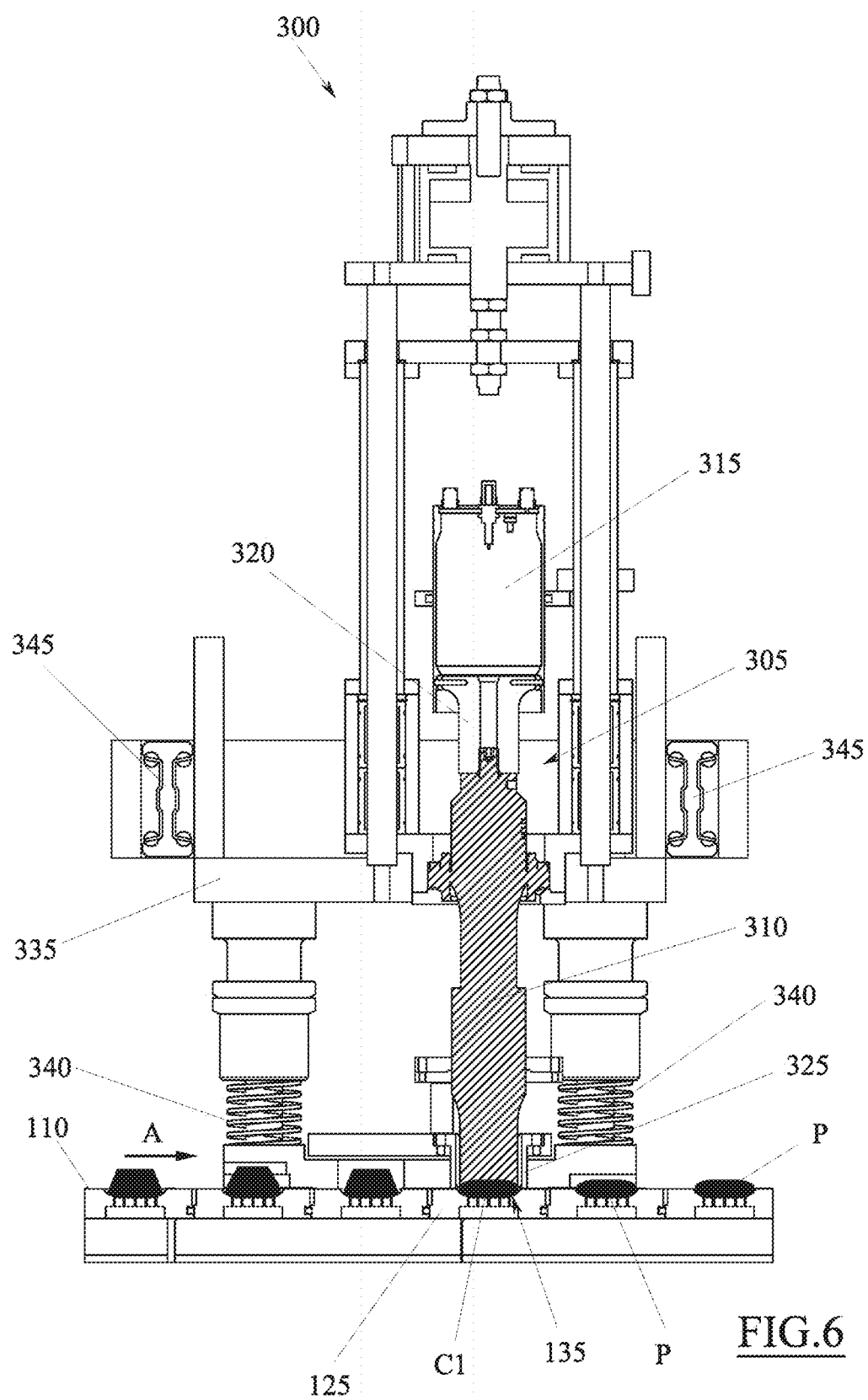
FIG. 6 is an enlargement of a compacting device of the apparatus of FIG. 3.
Figure 7:
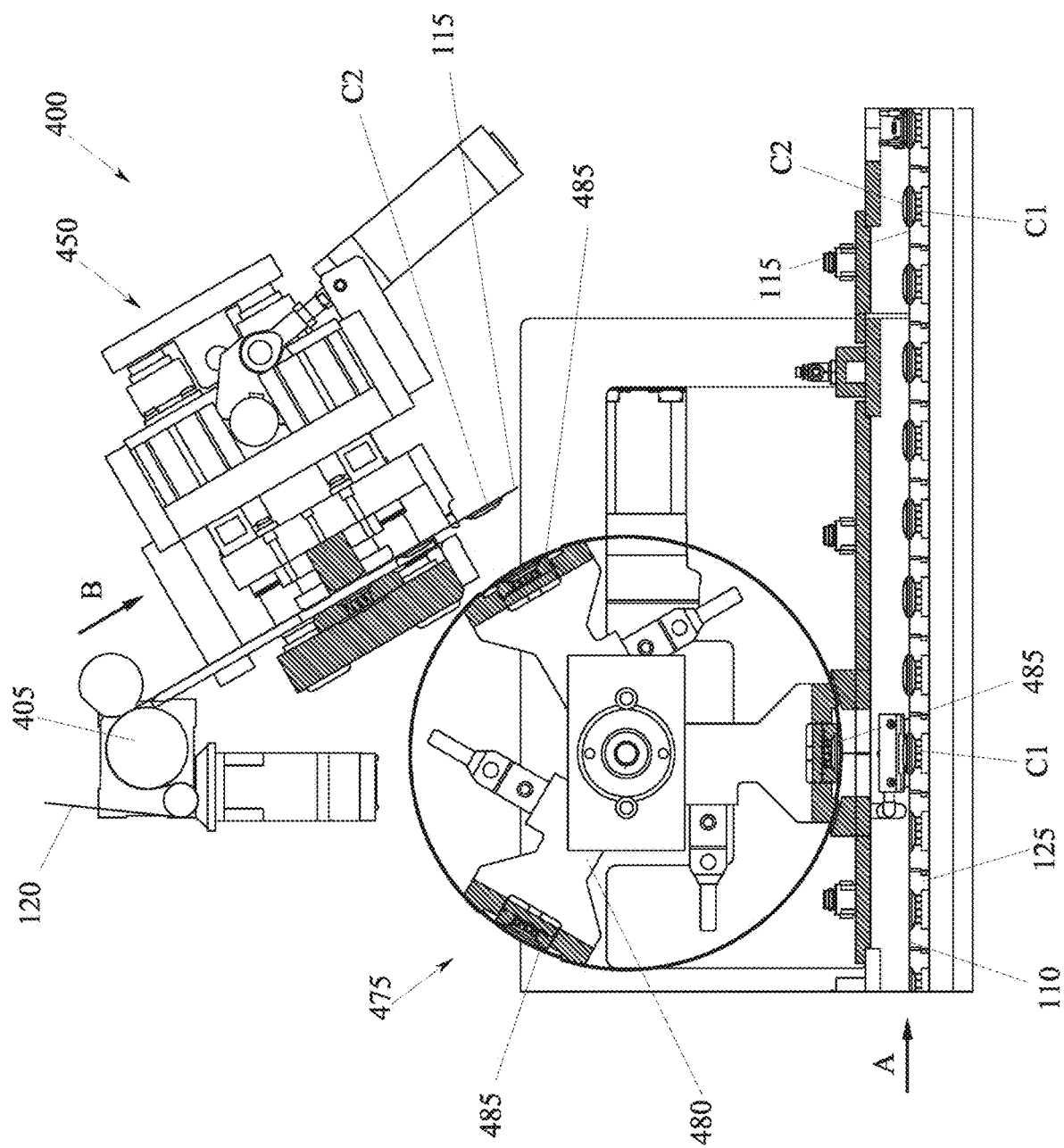
FIG. 7 is an enlargement of an applicator device of the apparatus of FIG. 3.

As shown in FIG. 6, the compacting device 300 comprises at least one vibrating group 305. Said vibrating group 305 may comprise a sonotrode 310, shaped like a substantially vertical axis cylindrical body, which is positioned above the belt 110 substantially aligned with the cavity 135 of the forming plate 125 below. The sonotrode 310 is connected to an electromechanical transducer 315, which in turn is connected to an ultrasonic generator (not shown). The ultrasonic generator is adapted to generate an electric wave having frequency comprised in the ultrasound range, which is transformed by the electromechanical transducer 315 into a mechanical vibration having the same frequency which is transferred to the sonotrode 310. Preferably, a booster 320 adapted to amplify the amplitude of the mechanical vibration may be interposed between the sonotrode 310 and the electromechanical transducer 315. The vibrating group 305 is associated with specific movement means that are adapted to move it between a raised position (not shown in the drawings), in which the sonotrode 310 is spaced apart from the belt 110, and a lowered position (shown in FIG. 6), in which the lower end of the sonotrode 310 is in contact with the dose of powder substance placed inside the lower cap C1 which is in the cavity 135 of the forming plate 125 below.

According to one aspect of the compacting device 300, the vibrating group 305 may also comprise a guiding jacket 325, which has a through hole in which the end stretch of the sonotrode 310 is coaxially and slidably received. The guiding jacket 325 is movable vertically between a raised position (not shown), in which it is spaced apart from the belt 110, and a lowered position (shown in FIG. 6), in which the guiding jacket 325 presses and locks the belt 110 against the upper surface of the forming plate 125 below, laterally surrounding and containing the dose of coffee. Preferably, the guiding jacket 325 is carried in lowered position, before the sonotrode 310 comes in contact with the dose of coffee.

To obtain this movement, the guiding jacket 325 may be associated with movement means that are independent from the ones that actuate the vibrating group 305. More preferably, the vibrating group 305 and the guiding jacket 325 may however be associated with a same vertically movable cross-beam 335, to which the vibrating group 305 may be rigidly connected, while the guiding jacket 325 may be connected by means of a series of elastic spring elements 340 that normally keep it suspended at a lower height than the lower end of the sonotrode 310.

Thereby, when the vibrating group 305 and the guiding jacket 325 both are in raised position, the belt 110 and the forming plates 125 with the doses of powder substance are free to slide up to bringing and stopping a forming plate 125 in the position in which the cavity 135, with the respective lower cap C1 and the respective dose of powder substance therein, is aligned below the sonotrode 310. At this point, the cross-beam 335 may be actuated to move downwards, first bringing the guiding jacket 325 in contact with the belt 110 and then allowing the sonotrode 310 to be inserted into the through hole of the guiding jacket 325, compressing the springs 340, up to reaching the lowered position. Thereby, the lower end of the sonotrode 310 compresses the dose of powder substance directly inside the lower cap C1, while the guiding jacket 325 absolves the function of laterally containing the dose in the compression step and preforming the perimeter flange of the pod M. Once the lowered position is reached, in addition to exerting the aforesaid axial compression, the sonotrode 310 is put into vibration by the electromechanical transducer 315 so as to subject the dose of coffee also to high-frequency mechanical vibrations, which are typically in the ultrasound range. The level of compaction of the dose of powder substance is significantly increased due to these mechanical vibrations assisted by the axial compression, allowing a substantially solid compacted powder tablet P to be obtained. The level of compression of said tablet P may be adjusted by conveniently modifying the amplitude of the mechanical vibrations, the time during which the dose remains subjected to said vibrations, the height of the dose released previously and the axial pressure exerted. In order to give a suitable shape to the tablet P, the lower end of the sonotrode 310 may be shaped so as to have a recess substantially equal to and mirroring the cavity 135 of the forming plate 125. Once the ultrasound compaction step is complete, the cross-beam 335 may be raised, bringing the sonotrode 310 and the guiding jacket 325 into the initial position, allowing the advancement of the belt 110 and of the forming plate 125, together with the tablet P.

Although reference was made in the preceding description to one vibrating group 305 alone, here too should each forming plate 125 have of a plurality of cavities 135 as explained above, the compacting device 300 could comprise a plurality of vibrating groups 305, each having a sonotrode 310 aligned with a respective cavity 135 and slidably received in a respective guiding jacket 325. All the vibrating groups 305 may also be mounted on sliding guides 345 in order to be extracted from the compacting device 300 for possible maintenance and control operations.

The operational devices then comprise, downstream of the compacting device 300, with respect to the advancement direction A of the belt 110, an applicator device 400 adapted to apply a sheet of waterproof material 115 on the belt 110 so as to cover the tablet P inside the lower cap C1 placed in the cavity of the forming plate 125. The sheet 115 is made of the same material with which the upper cap C2 is made. In particular, the sheet 115 has at least one deformed portion adapted to define the aforesaid upper cap C2 and is applied on the belt 110 so that such cap C2 overlaps the lower cap C1 in a mirroring manner, defining a shell that encloses the compacted powder tablet P. Should the forming plates 125 have a plurality of cavities 135, naturally it would be preferable for the sheet 115 to extend transversely for the whole width of the belt 110 and to have a plurality of deformed portions adapted to define just as many upper caps C2, each of which is intended to cover the tablet P that is supported in a corresponding cavity 135 of the forming plate 125. The sheet 115 may be obtained starting from a second flexible belt 120, which may be made of the same material with which the belt 110 is made and which may have substantially the same sizes.

Figure 8:
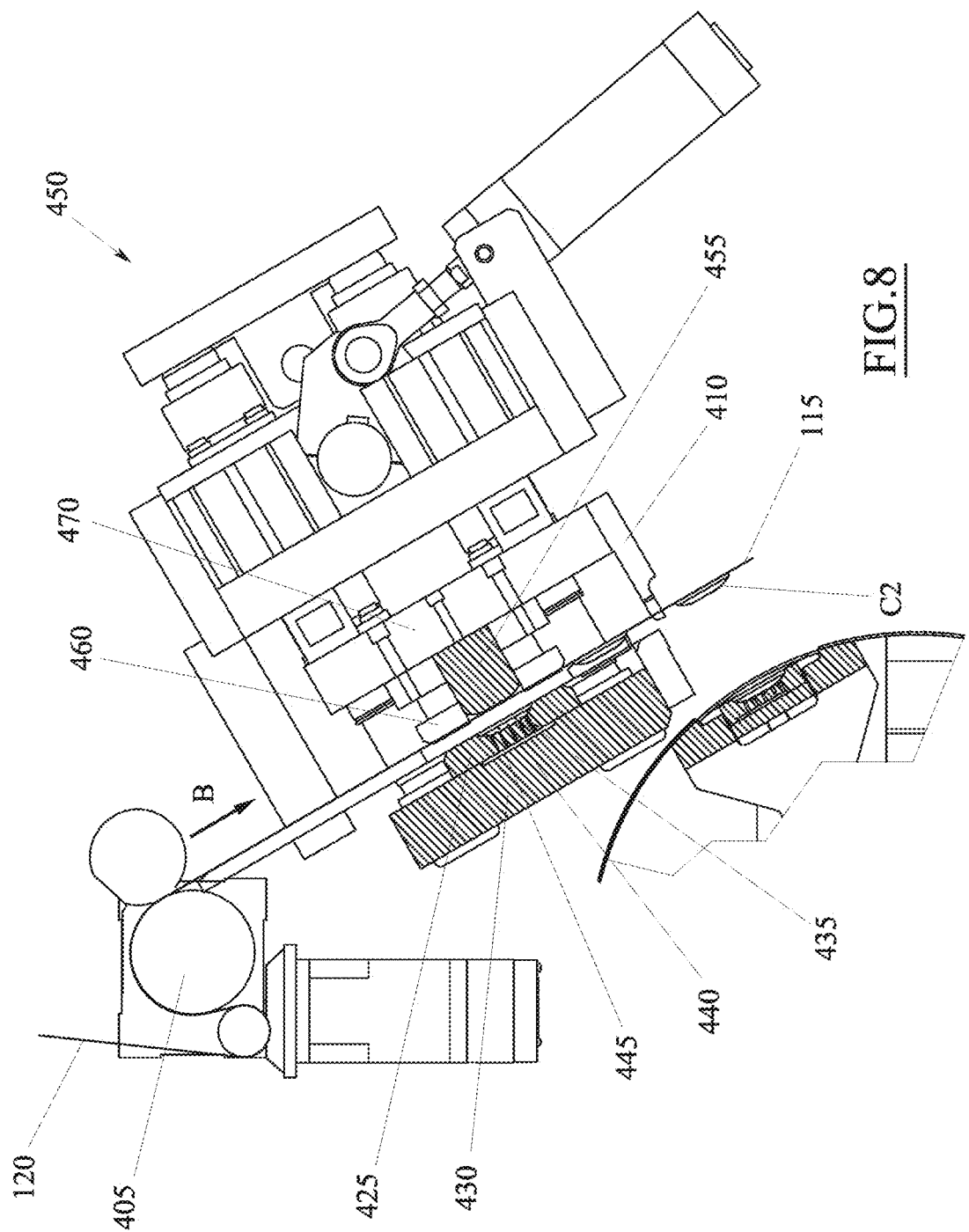
FIG. 8 is an enlarged portion of FIG. 7.

As shown in FIG. 8, the applicator device 400 comprises movement means adapted to advance the second belt 120 along a predetermined rectilinear direction B. The movement means (not illustrated because they are in themselves conventional) may comprise a motorized roller 405 and a series of guiding means that allow the end stretch of the belt 120 to travel an operating stretch in which it is extended and runs in the aforesaid rectilinear direction B. The movement means are controlled so that the advancement of the second belt 120 occurs in an intermittent manner at constant steps.

The applicator device 400 comprises a forming plate 425 at the operating stretch of the belt 120, which forming plate is carried by a back plate 430. The forming plate 425 substantially is identical to one of the forming plates 125 and therefore has at least one recess or cavity 435, which may substantially have the shape of a cup which concavity is facing the belt 120, which is over it. The cavity 435 of the forming plate 425 substantially is identical to the cavities 135 of the forming plates 125. The back plate 430 is associated with respective movement means (not illustrated because in themselves known, for example pneumatic cylinders) that are adapted to move the back plate 430 in direction orthogonal to the lying surface of the belt 120 in the operating stretch between an advanced position (not illustrated in the drawings), in which the forming plate 425 is placed in direct contact with the belt 120, and a retracted position (illustrated in FIG. 8), in which the forming plate 425 is separate from the belt 120 by a greater quantity than the depth of the cavity 435. Preferably, the forming plate 425 extends horizontally in direction orthogonal to the advancement direction B of the belt 120 for the whole width of the latter, and has, along the transverse extension thereof, a plurality of the aforesaid cavities 435, which are all individually facing the belt 112. The number of cavities 435 on the forming plate 425 is equal to the number of cavities 135 on each forming plate 125. The forming plate 425 may also comprise one or more through holes 440 adapted to put the cavity(ies) 435 into communication with a suction system adapted to create a predetermined vacuum therein. This suction system may comprise a recess 445 made in the upper surface of the back plate 430 and a vacuum pump (not illustrated) adapted to put said recess 445 in a vacuum. Thereby, the recess 445 acts as suction collector which, through the respective through holes 140, is put into direct communication with the cavity(ies) 435 of the forming plate 425.

The applicator device 400 comprises, at the forming plate 425, a pressing device 450 adapted to deform a portion of the belt 120 by pressing it down into the cavity 435 of the forming plate 425 below, giving it the shape of the upper cap C2. As shown in FIG. 8, the pressing device 450 may comprise a punch 455, for example substantially cylindrical-shaped and having axis orthogonal to the lying surface of the belt 120 in the operating stretch, which is positioned on the side opposite to the forming plate 425 and substantially is coaxial with the mouth of the cavity 435. The punch 455 is associated with movement means, for example of pneumatic type (e.g. pneumatic cylinders or the like), that are adapted to move it in axial direction between a retracted position (shown in FIG. 8), in which the end of the punch 455 is at least slightly spaced apart from the surface of the belt 120, to an advanced position (not shown), in which the end of the punch 455 is inserted inside the cavity 435 of the forming plate 425, so as to press down therein the portion of belt 120 interposed therebetween, deforming it. To improve this deformation step, the end of the punch 455 may be shaped in a complementary manner to the cavity 435, moreover the punch 455 could be heated in order to obtain a kind of thermoforming of the portion of belt 120. The pressure exerted by the punch 455 may be adjusted by adjusting the pressure in the pneumatic cylinders.

Also, the pressing device 450 may also comprise a locking plate 460, which has a through hole in which the punch 455 is coaxially and slidably received. Also, the locking plate 460 is movable in direction orthogonal to the lying surface of the belt 112 between a retracted position (shown in FIG. 8), in which it is flush or slightly spaced apart from the belt 120, and an advanced position (not shown), in which the locking plate 460 presses and locks the belt 112 against the surface of the forming plate 425, leaving free only the portion of the belt 120 that is delimited by the through hole. Preferably, the locking plate 460 is carried in lowered position, before the punch 455 comes in contact with the belt 120.

To obtain this movement, the locking plate 460 may be associated with movement means that are independent from the ones that actuate the punch 455. More preferably however, the punch 455 and the locking plate 460 may be associated with a same cross-beam 470 that is movable in direction orthogonal to the lying surface of the belt 120, to which the punch 455 may be rigidly connected, while the locking plate 460 may be connected by means of a series of elastic spring elements that normally keep it suspended in a position closer to the belt 120 with respect to the end of the punch 455.

Thereby, when the punch 455, the locking plate 460 and the back plate 430 all are in the respective retracted positions, the belt 120 is free to run with respect to the forming plate 425 up to positioning its undeformed portion in alignment with the cavity 435. At this point, the back plate 430 may be actuated in advanced position and the cross-beam 470 may be neared to the belt 120, first bringing the locking plate 460 in contact with the belt 120, locking it in a grip on the forming plate 425, and then allowing the punch 455 to be inserted into the through hole of the locking plate 460, simultaneously compressing the elastic spring elements, up to causing it to penetrate the cavity 435 of the forming plate 425. During these steps, the cavity 435 of the forming plate 425 is kept in vacuum through the suction system connected to the holes 440 so as to assist the punch 455 in deforming the portion of belt 120. After this deformation step, the cross-beam 470 and the back plate 430 may be moved away again so as to bring the punch 455, the locking plate 460 and the forming plate 425 into the respective initial positions, allowing the advancement of the belt 112 with the deformed portion, that is the upper cap C2 of the pod M, made thereon.

Although reference was made in the preceding description to one punch 455 alone, it is apparent here too that should each forming plate 425 have a plurality of cavities 435 as explained above, the pressing device 450 could comprise a plurality of punches 455, each aligned with a respective cavity 435 and slidably received inside a respective through hole of the locking plate 460.

Figure 9:
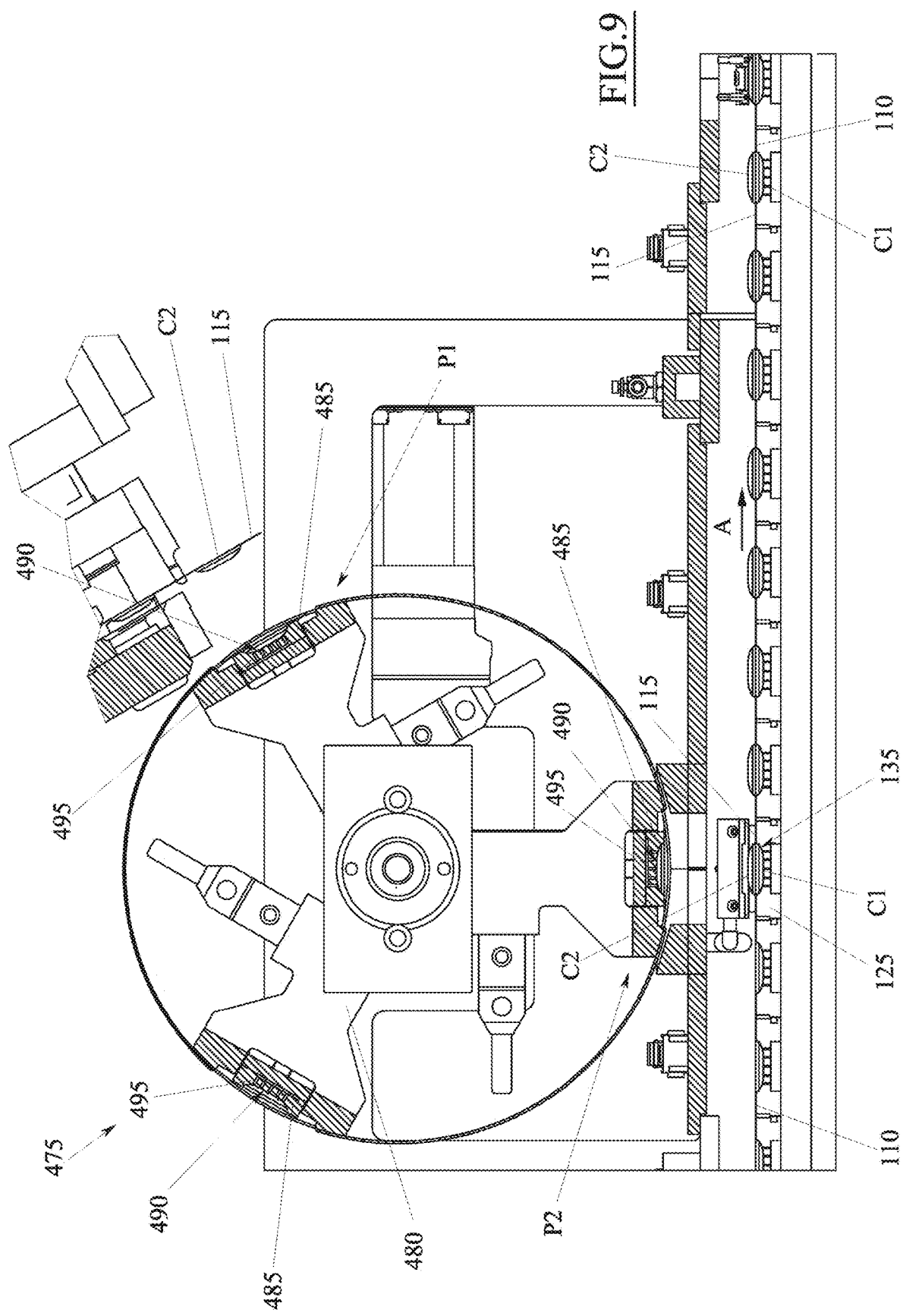
FIG. 9 is an enlarged portion of FIG. 7.

As shown in FIG. 9, the applicator device 400 comprises, downstream of the pressing device 450, with respect to the advancement direction B of the belt 120, cutting means 410 for separating the sheet 115 with the upper cap(s) C2 from the belt 120, and transfer means 475 adapted to receive the sheet 115 and bring it in position overlapping the compacted powder tablet P on the belt 110.

The transfer means 475 comprise a carousel 480 arranged above the belt 110 and adapted to rotate about a horizontal axis perpendicular to the advancement direction A of the belt 110 itself. The rotation of the carousel 480 may be obtained by means of an electric motor. A plurality of cross-beams 485 is installed on this carousel 480 (three in the example), which preferably are equally spaced from one another in angular direction. Each cross-beam 485 may substantially be identical to a forming plate 125 and has an outer surface orthogonal to the rotation axis of the carousel 480 and facing radially outwards. Each cross-beam 485 on this outer surface has at least one recess or cavity 490, which shape may substantially be identical to the one of the cavities 135 of the forming plates 125. Preferably, each cross-beam 485 extends horizontally and transversely in direction orthogonal with respect to the advancement direction A of the belt 110 and has, along the transverse extension thereof, a number of cavities 490 equal to the number of cavities 135 of the forming plates 125. Each cross-beam 485 is associated with the carousel 480 so as to move with respect thereto also in radial direction between a retracted configuration (shown in FIG. 9) and an extracted configuration (not illustrated) in which the cross-beam 485 is further away from the rotation axis with respect to when it is in retracted configuration. This radial movement of the cross-beams 485 may be obtained by means of specific pneumatic cylinders mounted on the carousel 480. Each cross-beam 485 may also comprise one or more through holes 495 adapted to put the respective cavity(ies) 490 into communication with a suction system adapted to create a predetermined vacuum therein. This suction system (not illustrated in detail because in itself conventional) is capable of generating the aforesaid vacuum also during the rotation of the carousel 480 and/or during the movement of the cross-beam 485 between the retracted position and the extracted position.

The rotation of the carousel 480 about itself occurs in a discontinuous manner, cyclically carrying and stopping each cross-beam 485 in an angular position for receiving the sheet 115 and in an angular position for releasing the sheet 115, indicated respectively with P1 and P2 in FIG. 9.

In the receiving position P1, the cross-beam 485 is arranged in such a manner that each cavity 490 is aligned in coaxial manner with a respective upper cap C2 made at the free end of the belt 112. Thereby, after the belt 120 is advanced following a deformation step, the cross-beam 485 that is in the receiving position P1 is moved in radial direction up to reaching the extracted configuration. In this configuration, the upper caps C2 obtained at the free end of the belt 120 are received and retained inside the cavities 490 where they may be firmly retained by means of the activation of the suction system. At this point, the cutting means 410, which may be made in the form of a blade directly connected with the cross-beam 470 of the pressing device 450, are lowered onto the belt 120, separating the free end and making the sheet 115. After the cutting, the cross-beam 485 is brought back into retracted configuration and the carousel 480 is placed in rotation for successive steps, up to arranging the cross-beam 485 in release position P2. The sheet 115 remains anchored to the cross-beam 485 during all these movement steps thanks to the suction system.

In the release position P2, the cross-beam 485 is arranged in such a manner that each cavity 490 is facing downwards and is vertically aligned with a respective cavity 135 of the forming plate 125 below. Thereby, the cross-beam 485 that is in release position P2 may be brought back to extracted configuration by resting the sheet 115 overturned on the belt 110 and closing each of the tablets P of compacted powder that are on the forming plate 125 between a lower cap C1 made in the belt 110 and a corresponding upper cap C2 made in the sheet 115. Sealing means, which during the release step also seal the ends of the sheet 115 on the belt 110, may be associated with the cross-beams 485 to avoid movements between the belt 110 and the sheet 115. The release step and the possible sealing step preferably are executed in protected atmosphere. After the release of the sheet 115, the cross-beam 485 is brought back to retracted configuration, allowing the carousel 480 to perform a new rotation step and simultaneously allowing the advancement of the belt 110 and of the forming plate 125.

Figure 10:
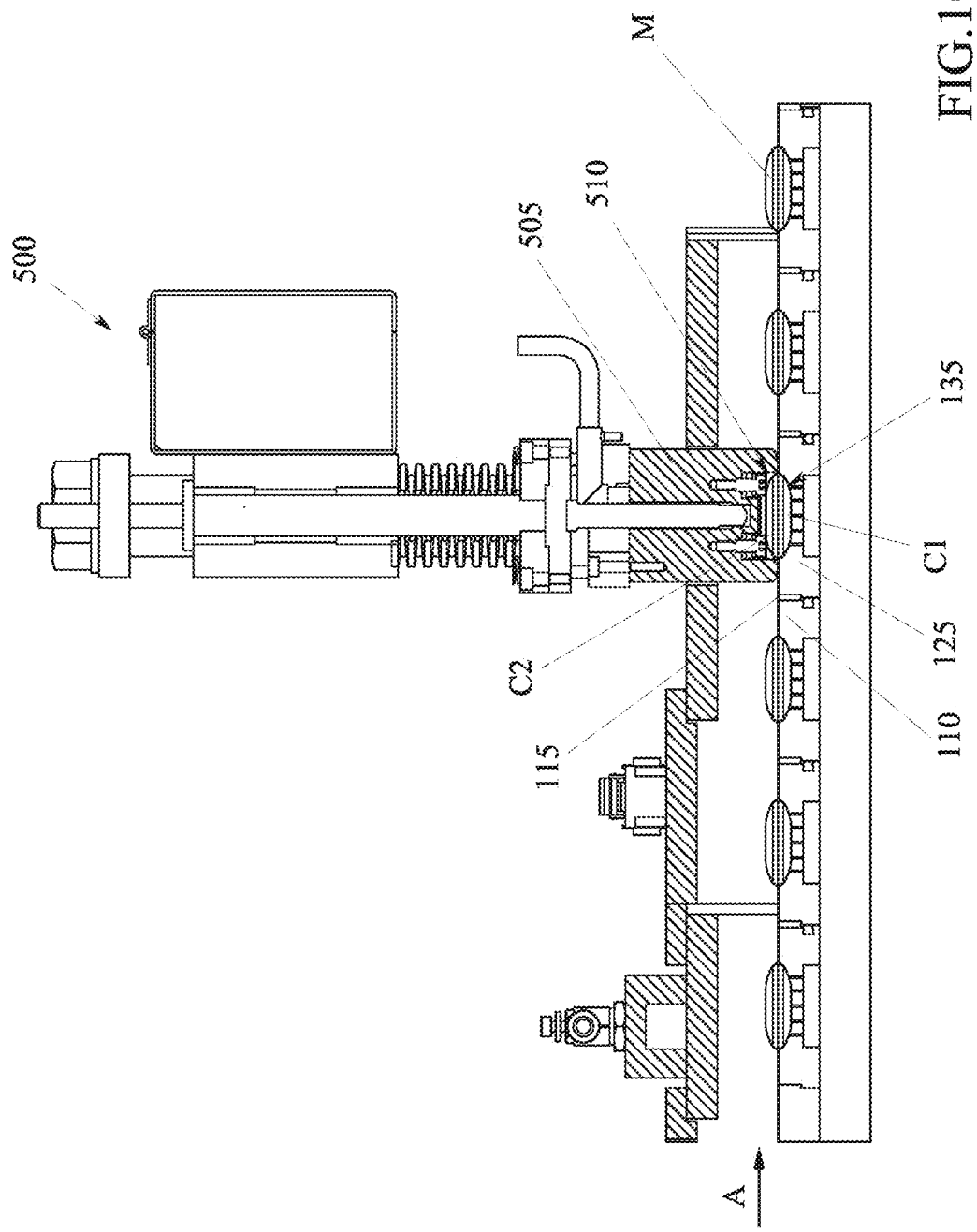
FIG. 10 is an enlargement of a sealing device of the apparatus of FIG. 3.

The operational devices then comprise, downstream of the applicator device 400, with respect to the advancement direction A of the belt 110, a sealing device 500 adapted to seal the sheet 115 to the belt 110, sealing the compacted coffee tablet between the caps C1 and C2 and therefore obtaining the pod M. As shown in FIG. 10, the sealing device 500 may comprise a sealing bar 505 placed above the belt 110 and which lower surface has at least one recess 510 vertically aligned with the cavity 135 of the forming plate 125 below. This recess 510 is sized so as to receive and surround the upper cap C2 made of the sheet 115 that covers the compacted powder tablet P. To perform the sealing, the sealing bar 505 is connected to suitable heating elements that are adapted to increase the temperature thereof up to suitable values, and is connected to movement means (for example, pneumatic cylinders) adapted to move it vertically between a lowered position (illustrated in FIG. 10), in which the lower surface of the sealing bar 510 contacts and presses the undeformed portion of the sheet 115 that surrounds the upper cap C2 against the undeformed portion below of the belt 110 that surrounds the lower cap C1, and a raised position (not illustrated), in which the lower surface of the sealing bar 505 is separated by the belt 110 by a greater quantity with respect to the height of the upper cap C2. Thereby, when the sealing bar 505 is in raised position, the belt 110 and the forming plates 125 are free to slide up to bringing and stopping a forming plate 125 in the position in which the cavity 135 is aligned below the recess 510 of the sealing bar 505. At this point, the sealing bar 505 may be activated to move downwards up to contacting and pressing the undeformed portion of the sheet 115 which, due to the effect of the pressure and the temperature, is sealed to the portion of the belt 110 below, permanently sealing the compacted powder tablet P and obtaining a pod M. This sealing step preferably is performed in protected atmosphere. After the sealing, the sealing bar 505 may be raised again, thereby allowing the advancement of the forming plate 125 and of the belt 110 on which the pod M is made.

Although reference was made in the preceding description to one sealing bar 505 having one recess 510 alone, it is apparent here too that should each forming plate 125 have a plurality of cavities 135 as explained above, the sealing bar 505 could extend transversely for the whole width of the belt 110 and could have a plurality of recesses 510, each vertically aligned with a respective cavity 135 of the forming plate 125.

The forming plates 125, downstream of the sealing device 500, with respect to the advancement direction A of the belt 110, leave the support surface 130 and go back, following the path of the chains, freeing the pods M made on the belt 110, which continues advancing in direction A along the operating stretch of its path.

Figure 11:
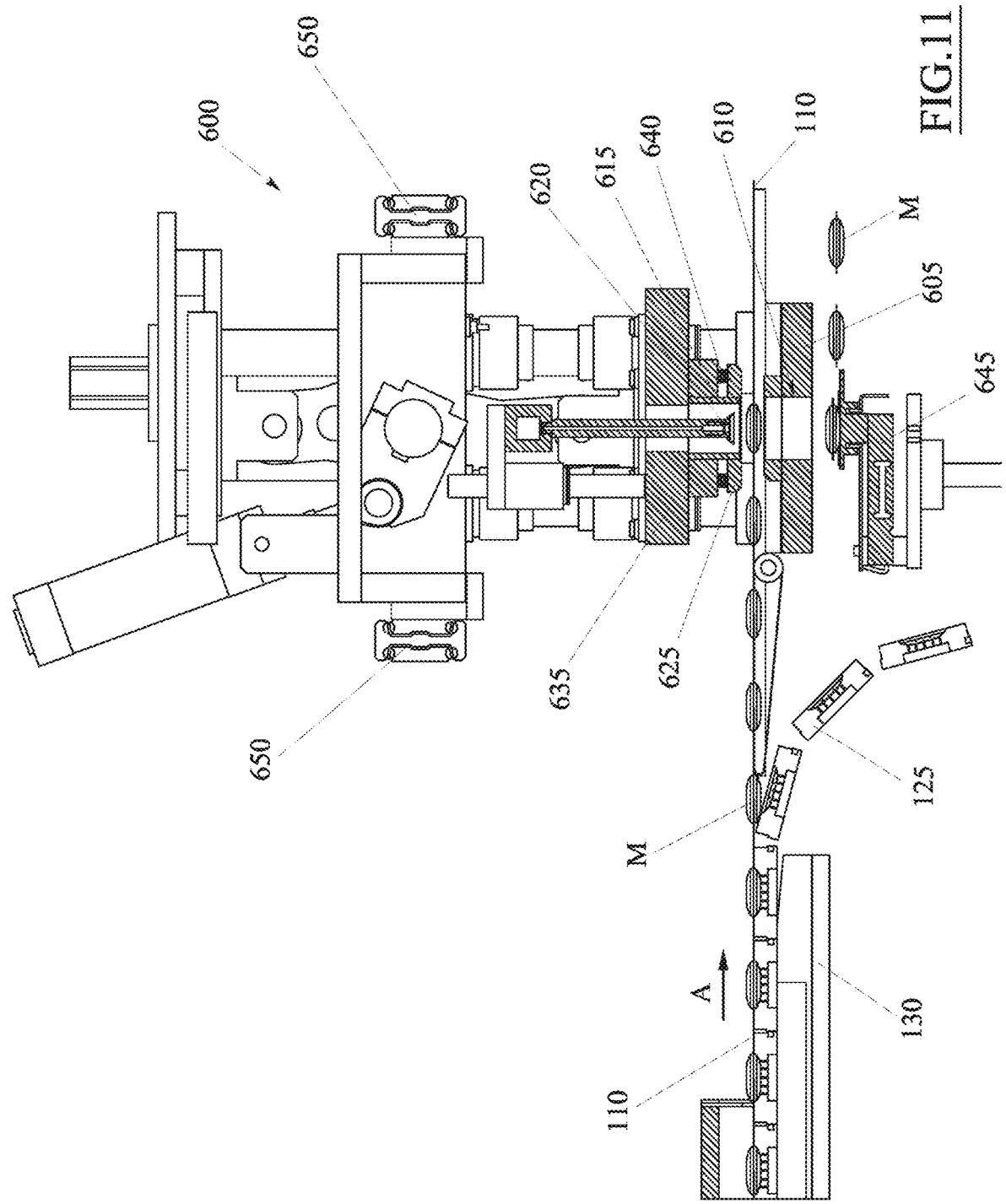
FIG. 11 is an enlargement of a cutting device of the apparatus of FIG. 3.

The operational devices comprise, at this last part of the operating stretch, a cutting device 600 that is adapted to cut the belt 110 in order to separate the individual pods M. As shown in FIG. 11, the cutting device 600 may comprise a lower plate 605 placed below the belt 110 and provided with a cavity 610, for example cylindrical-shaped with vertical axis, which is arranged substantially coaxial to the pod M made on the belt 110. The diameter of the cavity 610 is greater than the diameter of the pod M. The lower plate 605 may be associated with movement means (i.e. pneumatic cylinders or the like) adapted to move it vertically between a lowered position (shown in FIG. 11), in which it is spaced apart from the belt by a greater quantity than the depth of the lower cap C1, and a raised position (not shown), in which the lower plate 605 is placed in contact with the belt 110. The cutting device 600 comprises, on the opposite side of the belt 110, a hollow punch 615, for example cylindrical, that has a shape complementary to the one of the cavity 610 and is arranged coaxially with respect to the latter, so as to be able to be introduced therein. The outer diameter of the punch 615 substantially is equal to the inner diameter of the cavity 610 and the edge of the wall thereof is shaped to make a sort of cutter. The punch 615 is associated with movement means, for example of pneumatic type (e.g. pneumatic cylinders or the like), that are adapted to move it in vertical direction between a raised position (shown in FIG. 11), in which the lower end of the punch 615 is spaced apart from the upper surface of the belt 110, to a lowered position (not shown), in which the punch 615 is inserted into the cavity 610 of the lower plate 605, so as to cut the belt 110 interposed therebetween, separating the pod M. A rod that carries a bell 620 at the bottom may be received inside the punch 615, which rod is vertically movable together with the punch 615 and is associated with a suitable suction system for retaining the pod M after the cutting.

To improve this cutting step, the cutting device 600 may also comprise a locking plate 625, which has a through hole in which the punch 615 is coaxially and slidably received. The locking plate 625 is movable vertically between a raised position (shown in FIG. 11), in which it is spaced apart from the belt 110, and a lowered position (not shown), in which the locking plate 625 presses and locks the belt 110 against the upper surface of the lower plate 605, leaving free only the portion delimited by the through hole. Preferably, the locking plate 625 reaches the lowered position before the punch 615 comes in contact with the belt 110.

To obtain this movement, the locking plate 625 may be associated with movement means that are independent from the ones that actuate the punch 615. More preferably, the punch 615 and the locking plate 625 may however be associated with a same vertically movable cross-beam 635, to which the punch 615 may be rigidly connected, while the locking plate 625 may be connected by means of a series of elastic spring elements 640 that normally keep it suspended at a lower height than the lower end of the punch 615. Thereby, when the punch 615 and the locking plate 625 both are in raised position, and the lower plate 605 is in lowered position, the belt 110 is free to run up to bringing and stopping a pod M in position that is vertically aligned between the cavity of the punch 615 and the cavity 610 of the lower plate 605. At this point, the cross-beam 635 may be actuated to move downwards, while the lower plate 605 may be raised, so that the belt 110 is first clamped between the lower plate 605 and the locking plate 625 and then allowing the punch 615 to be inserted into the through hole of the locking plate 625, simultaneously compressing the elastic spring elements 640, up to causing it to also penetrate the cavity 610 of the lower plate 605 so as to obtain the cutting of the pod M. After the cutting, cross-beam 635 may be raised and the lower plate 605 lowered, so as to return to the initial positions, allowing the advancement of the belt 110 and the winding of the waste on the collection reel.

The separate pod M instead is initially retained by the bell 620, which then releases it, through the cavity 610 of the lower plate 605, to a weighing device 645 (in itself conventional), from which the pod M finally is moved away and possibly sent to other process steps, for example packaging.

Although reference was made in the preceding description to one punch unit 615 alone, here too should each forming plate 125 have a plurality of cavities 135 as explained above, the cutting device 600 could comprise a plurality of punches 615, each vertically aligned with a respective cavity of the locking plate 625 and a respective cavity of the lower plate 605, which are vertically aligned with a respective pod M. The cutting device 600 may also be mounted on sliding guides 650 in order to be extracted from the apparatus 100 for possible maintenance and control operations.

Obviously, an expert in the field may make several technical-applicative modifications to the apparatus 100 described above, without departing from the scope of the invention as hereinbelow claimed.

The invention claimed is:

1. An apparatus for manufacturing pods for beverage extraction machines comprising:
    a belt of waterproof material,
    movement means to advance the belt of waterproof material in a first predetermined rectilinear direction,
    a plurality of forming plates arranged below the belt and individually provided with at least one cavity facing the belt itself,
    movement means to advance said forming plates in the first predetermined rectilinear direction and in a synchronized manner with the belt, and
    a plurality of operational devices arranged in succession along the first predetermined rectilinear direction,
    wherein said operational devices comprise at least:
        a first punch device for pressing down a portion of the belt into a cavity of a forming plate of the plurality of forming plates, impressing the shape of a first cap therein,
        a dispensing device for releasing a dose of a powder substance inside the first cap placed in the cavity of the forming plate,
        a compacting device for compacting the dose inside the first cap placed in the cavity of the forming plate, obtaining a compacted tablet,
        a second cap of waterproof material,
        an applicator device for applying the second cap of waterproof material on the compacted tablet inside the first cap placed in the cavity of the forming plate,
        a sealing device for sealing the second cap to the belt obtaining a pod, and
        a cutting device for cutting the belt separating the pod,
    wherein the compacting device for compacting the dose comprises a vibrating group configured to transmit a mechanical vibration to the dose,
    wherein the vibrating group comprises:
        an ultrasonic generator configured to generate an electric wave having an ultrasound frequency,
        an electromechanical transducer configured to transform the electric wave into a mechanical vibration, and
        a sonotrode configured to transfer the mechanical vibration generated by the electromechanical transducer to the dose,
    wherein the sonotrode is configured to move between a raised position, in which the sonotrode is separated from the dose, to a lowered positioned, in which the sonotrode presses the dose against the first cap placed in the cavity of the forming plate,
    wherein the sonotrode is slidably received inside a guiding jacket which is configured to move between a raised position, in which the guiding jacket is spaced apart from the belt, and a lowered position, in which the guiding jacket presses and locks the belt against the forming plate, laterally surrounding the first cap and the dose placed in the cavity of the forming plate.

2. The apparatus according to claim 1, wherein the compacting device for compacting the dose further comprises a booster interposed between the electromechanical transducer and the sonotrode to amplify the mechanical vibration.

3. The apparatus according to claim 1, wherein the applicator device for applying the second cap of waterproof material comprises:
    movement means to advance a second belt of waterproof material in a second predetermined rectilinear direction,
    a forming plate placed below the second belt and provided with at least one cavity facing the second belt itself,
    a second punch device for pressing down a portion of the second belt into the cavity of the forming plate, impressing the shape of the second cap therein,
    cutting means for cutting the second belt separating a sheet which contains the second cap, and
    transfer means adapted to receive said sheet and to bring said sheet to an overlapping position with the compacted tablet.

4. The apparatus according to claim 3, wherein the transfer means comprise a rotating carousel provided with a plurality of support beams, each support beam individually provided with at least one cavity and movable, due to rotation of the carousel, between a receiving position, in which the at least one cavity of the respective support beam is aligned and facing towards the second cap obtained on the sheet separated from the second belt, to a release position, in which the at least one cavity of the respective support beam is facing downwards and aligned with the compacted tablet.

5. The apparatus according to claim 4, wherein the transfer means comprise suction means for creating a vacuum inside the at least one cavity of the respective support beam.

6. A method for manufacturing pods for beverage extraction machines comprising the steps of:
    advancing a belt of waterproof material in a predetermined rectilinear direction,
    arranging below the belt a plurality of forming plates individually provided with at least one cavity facing the belt itself,
    advancing said forming plates in the predetermined rectilinear direction and in a synchronized manner with the belt,
    pressing down a portion of the belt inside a cavity of a forming plate of the plurality of forming plates thereby impressing a shape of a first cap therein, releasing a dose of a powder substance inside the first cap placed in the cavity of the forming plate, compacting the dose inside the first cap placed in the cavity of the forming plate obtaining a compacted tablet, applying a second cap of waterproof material on the compacted tablet inside the first cap placed in the cavity of the forming plate, sealing the second cap to the belt obtaining a pod, and cutting the belt to separate the pod, wherein the compacting step provides for transmitting ultrasonic mechanical vibrations to the dose by means of a sonotrode which is moved between a raised position, in which the sonotrode is separated from the dose, to a lowered position, in which the sonotrode presses the dose against the first cap placed in the cavity of the forming plate, wherein the sonotrode is slidably received inside a guiding jacket which is movable between a raised position, in which the guiding jacket is spaced apart from the belt, and a lowered position, in which the guiding jacket presses and locks the belt against the forming plate, laterally surrounding the first cap and the dose placed in the cavity of the forming plate.

7. The method according to claim 6, wherein the guiding jacket is carried in the lowered position, before the sonotrode comes in contact with the dose of coffee.

8. An apparatus for manufacturing pods for beverage extraction machines comprising:

a belt of waterproof material, movement means to advance the belt of waterproof material in a first predetermined rectilinear direction, a plurality of forming plates arranged below the belt and individually provided with at least one cavity facing the belt itself, movement means to advance said forming plates in the first predetermined rectilinear direction and in a synchronized manner with the belt, and a plurality of operational devices arranged in succession along the first predetermined rectilinear direction of the belt, wherein said operational devices comprise at least:

a first punch device for pressing down a portion of the belt into a cavity of a forming plate of the plurality of forming plates, impressing the shape of a first cap therein, a dispensing device for releasing a dose of a powder substance inside the first cap placed in the cavity of the forming plate, a compacting device for compacting the dose inside the first cap placed in the cavity of the forming plate, obtaining a compacted tablet, a second cap of waterproof material, an applicator device for applying the second cap of waterproof material on the compacted tablet inside the first cap placed in the cavity of the forming plate, a sealing device for sealing the second cap to the belt obtaining a pod, and a cutting device for cutting the belt separating the pod, wherein the compacting device for compacting the dose comprises a vibrating group adapted to transmit a mechanical vibration to the dose, wherein the vibrating group comprises:

an ultrasonic generator adapted to generate an electric wave having an ultrasound frequency, an electromechanical transducer adapted to transform the electric wave into a mechanical vibration, and a sonotrode adapted to transfer the mechanical vibration generated by the electromechanical transducer to the dose, wherein the sonotrode is configured to move between a raised position, in which the sonotrode is separated from the dose, to a lowered positioned, in which the sonotrode presses the dose against the first cap placed in the cavity of the forming plate, wherein the sonotrode is slidably received inside a guiding jacket which is configured to move between a raised position, in which the guiding jacket is spaced apart from the belt, and a lowered position, in which the guiding jacket presses and locks the belt against the forming plate, laterally surrounding the first cap and the dose placed in the cavity of the forming plate, wherein the applicator device for applying the second cap of waterproof material comprises:

movement means to advance a second belt of waterproof material in a second predetermined rectilinear direction, a forming plate placed below the second belt and provided with at least one cavity facing the second belt itself, a second punch device for pressing down a portion of the second belt into the cavity of the forming plate, impressing the shape of the second cap therein, cutting means for cutting the second belt separating a sheet which contains the second cap, and a rotating carousel adapted to receive said sheet and to bring said sheet to an overlapping position with the compacted tablet.

\* \* \* \* \*